(No Model.) 3 Sheets—Sheet 1.

J. C. BECKFIELD.
WATER HEATER.

No. 583,275. Patented May 25, 1897.

(No Model.)

J. C. BECKFIELD.
WATER HEATER.

No. 583,275. Patented May 25, 1897.

3 Sheets—Sheet 2.

WITNESSES

INVENTOR

John C. Beckfield
by James K. Bakewell
his attorney (No Model.) 3 Sheets—Sheet 3.
J. C. BECKFIELD.
WATER HEATER.

No. 583,275. Patented May 25, 1897.

WITNESSES:
F. E. Harpell
George B. Blemming

INVENTOR
John C. Beckfield
BY James K. Bakewell
his
ATTORNEY.

UNITED STATES PATENT OFFICE.

JOHN C. BECKFIELD, OF PITTSBURG, PENNSYLVANIA, ASSIGNOR TO THE BECKFIELD WATER HEATER COMPANY, OF SAME PLACE.

WATER-HEATER.

SPECIFICATION forming part of Letters Patent No. 583,275, dated May 25, 1897.

Application filed October 16, 1895. Serial No. 565,843. (No model.)

*To all whom it may concern:*

Be it known that I, JOHN C. BECKFIELD, of Pittsburg, in the county of Allegheny and State of Pennsylvania, have invented a new and useful Improvement in Water-Heaters, of which the following is a full, clear, and exact description, reference being had to the accompanying drawings, forming part of this specification, in which—

Figure 1:
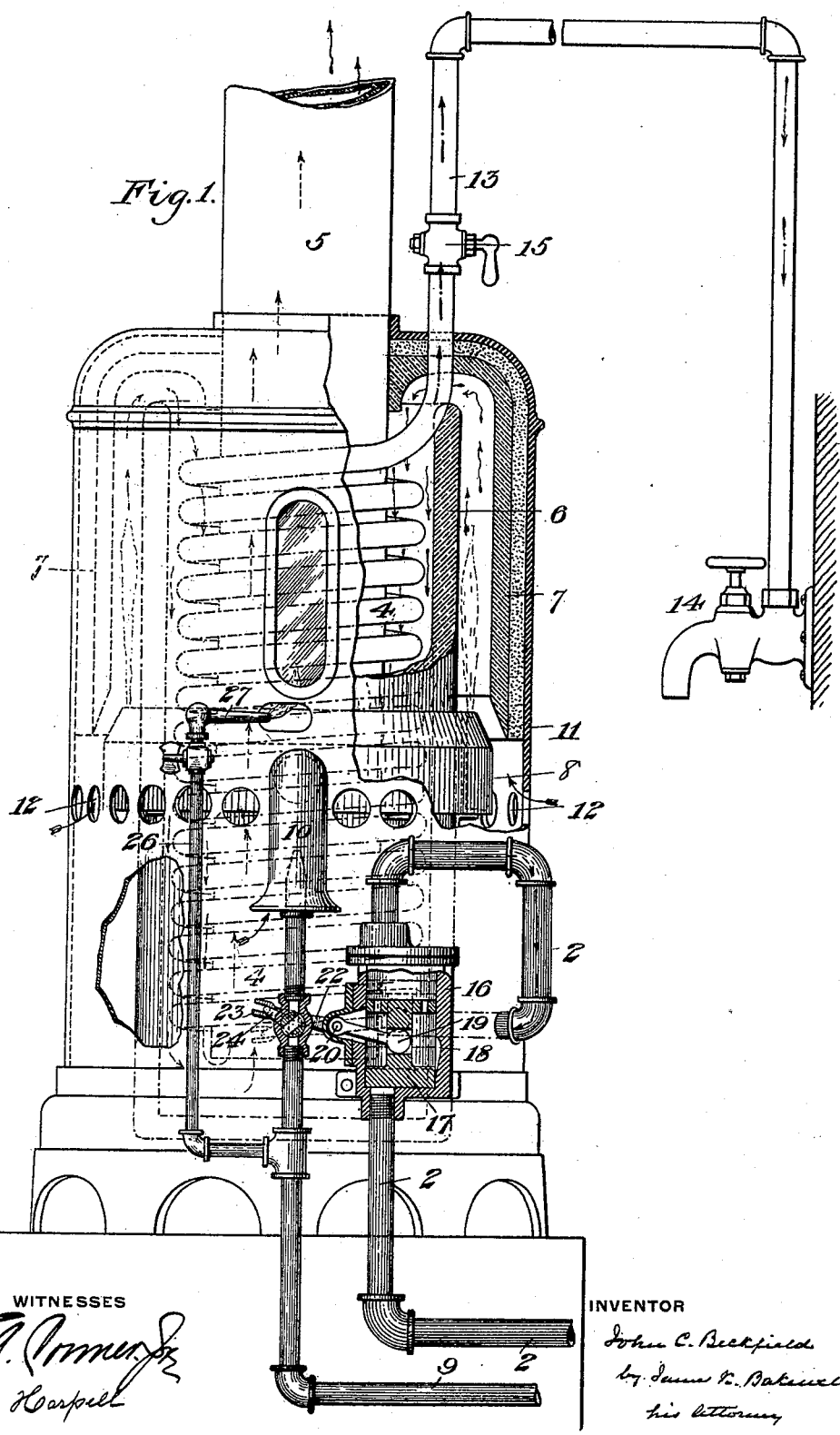
Figure 2:
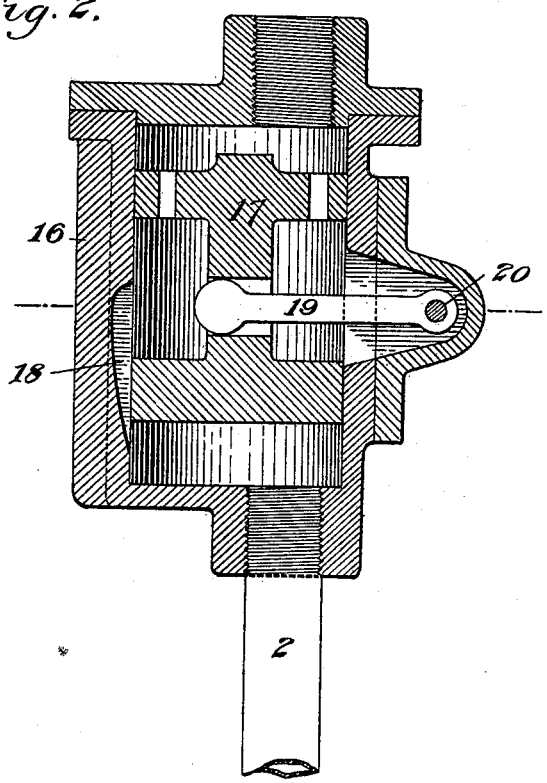
Figure 3:
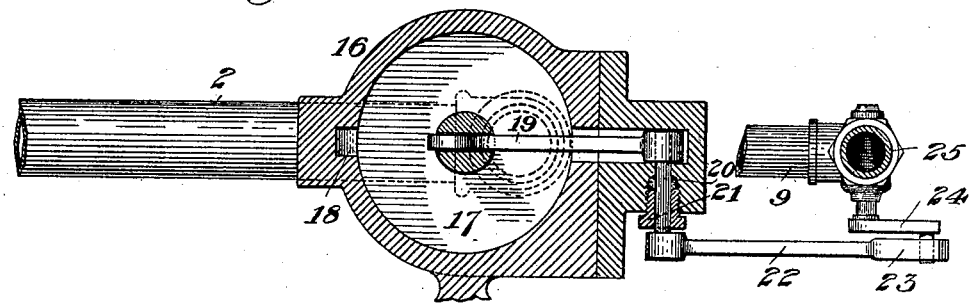
Figure 4:
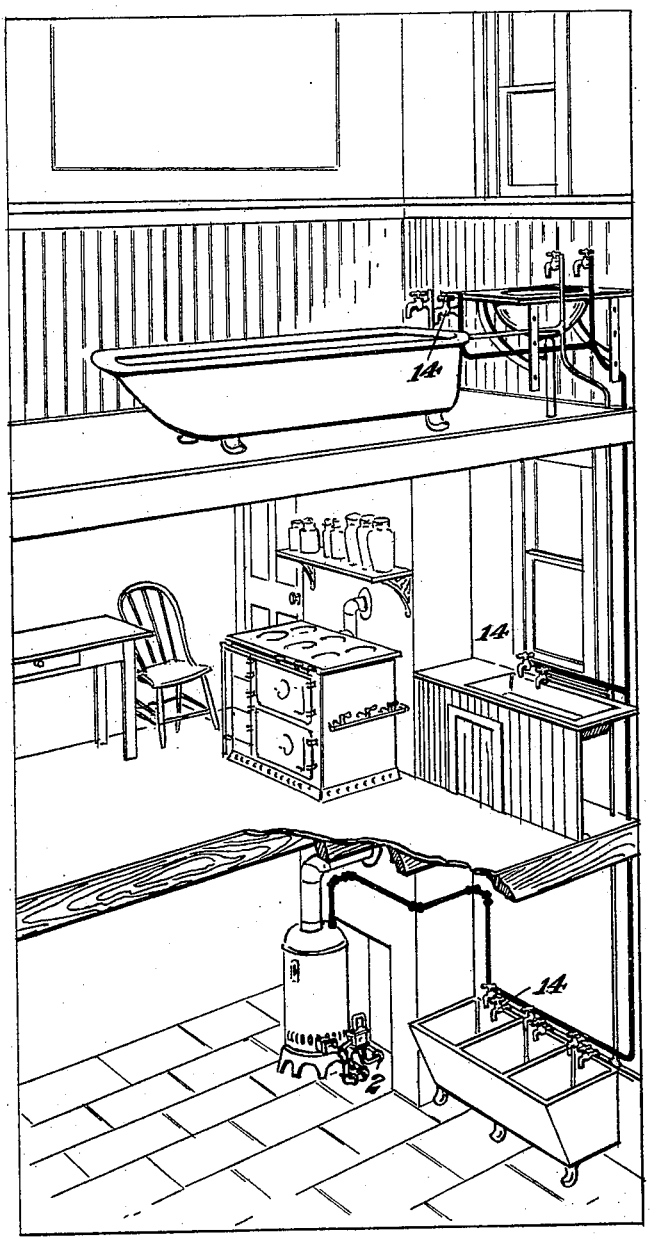

Figure 1 is an elevation, partially in section, showing the heating device. Fig. 2 is a vertical sectional view of the water-supply valve. Fig. 3 is a horizontal sectional view of the same, and Fig. 4 is a view showing three stories of a building provided with my improved water-heating system.

Like symbols of reference indicate like parts wherever they occur.

My invention relates to certain improvements in water-heaters whereby the application of heat to the water-receptacle is controlled by the opening and closing of the faucets in the outlet-pipes connected to such receptacle; and it consists in a heater composed of a heating device, such as a gas-burner; a water receptacle adapted to contain the water under pressure, which receptacle may be in the form of a tube, pipe, cylinder, or coil; a water valve or regulator or motor adapted to be operated by the pressure or flow of water through the water-conduit; a gas-valve or other regulator for turning on and shutting off the supply of heat; devices connecting the water valve or motor with the heat-supply regulator, and a faucet or faucets at different points in the delivery-conduit whereby water may be drawn from the water-heater, and by the flow of water through the heater the heat-regulator is opened, allowing heat to be applied to the water as it flows through the heater so long as the faucet remains open. As soon as the faucet is closed and the flow of water ceases the heat is automatically shut off. Owing to this combination it is possible to place the heater in the basement or cellar of a building and to operate the same by means of faucets arranged in the hot-water pipe at numerous points on the various stories or floors of the building, or several buildings may be supplied with hot water from a single heater situate at any desired point, the heater being automatically set in operation by the opening of the faucet at any point in the building and automatically shut off by the closing of the faucets.

I will now describe my invention, so that others skilled in the art may manufacture and use the same.

In the drawings I have shown my improved heater adapted to the use of gas as a heating agent, the gas being led to a burner situate in proper proximity to a coil containing the water under pressure, the coil forming part of the conduit from the city main to the faucet by which the hot water is drawn from the pipe.

In the drawings, 2 represents a water-pipe leading from a source of supply, such as the city main, to the coil 4 in the water-heater. This heater is composed of the stack 5, which is surrounded by the coil 4, the inner casing 6, which is formed of refractory material and is closed at its base and open at the top, forming a flue about the coil 4, the outer casing 7 about the upper portion of the casing 6, forming a flue between the two casings, and a gas-burner 8, situate at the base of the casing 7 and connected with the gas-supply pipe 9. The gas-supply pipe 9 is provided with the usual mixer 10, and in the outer jacket 11 are air-inlet openings 12. Leading from the coil 4 is the hot-water pipe 13, provided with a faucet 14 at the point where it is desired that the water be delivered, and also with a stop-cock 15, by means of which the flow of water from the coil 4 may be regulated. The water-supply pipe 2, instead of leading directly to the coil 4, leads to a regulating-valve chamber 16, in which is the valve 17, arranged to close the flow of water from the mouth of the pipe 2. In the side of the valve-chamber is a tapered passage 18 for the flow of water from below to a point above the valve-head. Seated in the stem of the valve is one end of a lever rod or arm 19, the other end of which arm is keyed to the spindle 20, that extends out through the stuffing-box 21. This spindle is keyed to the crank-lever 22, at the outer end of which is a fork 23, that engages with the arm 24 of the gas-supply cock 25 in the gas-supply pipe 9. Extending from the gas-supply pipe 9 is the gas-pipe 26, which is provided with a jet 27 at a point above the burner 8, or an electric lighter may be employed with mechanism connected with the levers.

The operation is as follows: When it is desired to draw hot water from the heater, the faucet 14 is opened, the cock 15 being also open, which allows water to flow from the coil 4, whereby the pressure of water above the valve 17 is lessened, and the pressure of the water in the pipe 2 raises the valve 17, allowing the water to flow from the pipe 2 through the passage 18 and the valve-chamber 16 to the coil 4. The upward movement of the valve 17 raises the lever-arm 19, and thereby opens the gas-cock 25, allowing gas to pass to the burner 8, where it is ignited by the ignited gas-jet 27, and as the water passes through the coil 4 it is heated by the flame from the burner 8. When the faucet 14 is closed and the flow of water through the coil 4 ceases, the pressure of water above the valve 17 being restored, the valve 17 drops of its own weight, thereby shutting off the supply of the gas to the burner 8. In practice I have found that with a heater such as is shown in the drawings water may be raised to temperature of 212° Fahrenheit in one minute. The time required for the passage of a given quantity of water through the coil 4 may be regulated by the stop-cock 15.

In Fig. 4 I show the heater located in the basement and arranged to be operated by the faucets in the laundry in the basement, by the faucet in the kitchen on the first floor, or by the faucet in the bath-room on the second floor. In the same manner the pipes may lead to any number of rooms, from any one of which the heater may be operated by merely opening the faucet and allowing the water to flow from the pipe.

Any suitable form or construction of motor adapted to be controlled by the flow of water to or from the heater may be employed for controlling the means employed for heating the water.

The tapering passage or supply-port 18 is so proportioned and located with reference to the travel of the piston or abutment 17 that the movement of the valve or piston, and consequently the opening of the gas-valve, will be approximately in direct proportion to the volume of flow through the faucets. The tapering passage or port has its lower end so located that it will not be entirely closed at any time by the piston, so as to compensate for leaky or partially-closed faucets. As water is drawn from one or more faucets the piston or abutment is raised by pressure in the supply-pipe until the passage or port 18 has been opened sufficiently far to permit of the passage of a volume equal to that flowing from the open faucets. As soon as the flow through the port or passage equals that through the faucet or faucets equilibrium of pressure on each side of the piston or abutment will be established and the latter will cease to move. If, however, more faucets be opened, the piston will be forced farther up until the volume of water passing through the groove 18 will equal the volume flowing from the open faucets; and, further, if a number of faucets are opened and then one or more of them be closed the piston or abutment will be forced down a proportional distance. As the piston or abutment controls the heat-generator, the heat applied to the coil will be proportioned to the flow of water.

It is characteristic of the improved heater that the water flowing through the coil will be raised to and maintained at approximately the desired temperature regardless of the volume passing through the coil.

The advantages of my invention will be apparent to those skilled in the art. The water-heater may be left undisturbed ready to be set in operation by merely drawing water from the pipes at any distance from the heater, and, as the gas is only turned on during the time that water is being drawn from the pipes, the usual loss of heat by radiation where a storage of hot water is kept is obviated.

My device is designed not merely as a safety appliance attached to water-heaters, but as a new and useful apparatus or mechanical means whereby the apparatus may be operated and water may be heated by merely opening the faucet at the point of delivery, however remote the faucet may be from the heater.

Having thus described my invention, what I claim, and desire to secure by Letters Patent, is—

1. The combination of a fluid-receptacle having a supply and one or more outlet pipes, a heat-generator and means controlled by the flow of fluid through the receptacle for regulating the heat-generator proportionally to such flow, substantially as set forth.

2. The combination of a fluid-receptacle having a supply and one or more outlet pipes provided with faucets, a heater and a movable abutment or piston in the supply-pipe for regulating the heat-generator constructed to be shifted in proportion to the flow of water through the receptacle, substantially as set forth.

3. The combination of a fluid-receptacle having a supply and one or more outlet pipes, a heater, a case or shell in the supply-pipe provided with a taper passage or port, a valve or piston controlling the flow of fluid through said passage, and means controlled by the valve or piston for regulating the heat-generator, whereby the heat generated will be proportional to the flow of water through the receptacle, substantially as set forth.

4. The combination of a fluid-receptacle having a supply and one or more outlet pipes, a gas-burner for heating the receptacle having a valved supply-pipe, a movable abutment or piston in the supply-pipe of the receptacle constructed to be shifted in proportion to the flow of fluid through the receptacle and connected to the valve in the gas-supply pipe, substantially as set forth.

In testimony whereof I have hereunto set my hand.

JOHN C. BECKFIELD.

Witnesses:
W. P. POTTER,
F. E. HARPELL.